(12) United States Patent
Hirai et al.

(10) Patent No.: US 9,010,719 B2
(45) Date of Patent: Apr. 21, 2015

(54) FLOW CONTROL DEVICE

(71) Applicant: Surpass Industry Co., Ltd., Gyoda-shi, Saitama (JP)

(72) Inventors: Kazuki Hirai, Saitama (JP); Hiroki Igarashi, Saitama (JP)

(73) Assignee: Surpass Industry Co., Ltd., Gyoda-Shi, Saitama (JP)

( * ) Notice: Subject to any disclaimer, the term of this patent is extended or adjusted under 35 U.S.C. 154(b) by 9 days.

(21) Appl. No.: 13/747,869

(22) Filed: Jan. 23, 2013

(65) Prior Publication Data

US 2013/0207010 A1    Aug. 15, 2013

(30) Foreign Application Priority Data

Jan. 26, 2012 (JP) ................................. 2012-014273

(51) Int. Cl.
*F16K 31/00* (2006.01)
*F16K 31/126* (2006.01)

(52) U.S. Cl.
CPC .................................. *F16K 31/1266* (2013.01)

(58) Field of Classification Search
USPC .......... 251/61.2, 61.3, 335.2; 92/98 R, 99, 78
See application file for complete search history.

(56) References Cited

U.S. PATENT DOCUMENTS

| | | | |
|---|---|---|---|
| 942,042 A | 11/1909 | Petley | |
| 2,684,829 A * | 7/1954 | McFarland, Jr. | 251/331 |
| 2,735,441 A | 2/1956 | Regna | |
| 2,916,255 A * | 12/1959 | Koehler | 251/331 |
| 2,981,275 A | 4/1961 | Young et al. | |
| 3,113,756 A | 12/1963 | Griffo | |
| 3,183,788 A * | 5/1965 | Olsson | 91/342 |
| 3,557,831 A | 1/1971 | Katchka | |
| 3,588,923 A | 6/1971 | Haglund et al. | |
| 4,050,861 A * | 9/1977 | Sakai et al. | 417/471 |
| 4,171,792 A * | 10/1979 | Bass | 251/335.2 |
| 4,741,252 A * | 5/1988 | Harter et al. | 92/103 SD |
| 4,754,777 A | 7/1988 | Frode | |
| 5,358,004 A | 10/1994 | Atkinson et al. | |

(Continued)

FOREIGN PATENT DOCUMENTS

JP    2004162774    6/2004

OTHER PUBLICATIONS

Office Action dated Dec. 19, 2014, for co-pending U.S. Appl. No. 13/747,848.

*Primary Examiner* — John K Fristoe, Jr.
*Assistant Examiner* — Umashankar Venkatesan
(74) *Attorney, Agent, or Firm* — Thomas, Karceski & Karmilovich, PC

(57) ABSTRACT

A flow control device is capable of performing accurate flow control over a wide pressure range. The flow control device includes: a housing; a diaphragm splitting the housing into a gas chamber side to which gas is introduced and a fluid chamber side through which fluid passes, and being activated by the differential pressure generated between the gas chamber side and the fluid chamber side; and a valve body which operates in integration with the diaphragm to regulate the flow of the fluid introduced to the fluid chamber side. The diaphragm includes: a base part provided in a substantially central part of the diaphragm; and a thin film part provided on the outer rim of the base part. An opposing surface which is provided on the fluid chamber side to oppose the diaphragm includes a retaining form which retains the shape of the thin film part deformed by the differential pressure.

2 Claims, 6 Drawing Sheets

(56) References Cited

U.S. PATENT DOCUMENTS

| | | | |
|---|---|---|---|
| 5,609,138 A * | 3/1997 | Mutschler | 123/463 |
| 5,967,173 A * | 10/1999 | Kingsford et al. | 137/312 |
| 5,983,926 A | 11/1999 | Mastuzawa | |
| 6,415,818 B2 * | 7/2002 | Dickman et al. | 137/596.16 |
| 6,883,780 B2 * | 4/2005 | Browne et al. | 251/331 |
| 6,988,710 B2 * | 1/2006 | Igarashi | 251/368 |
| 7,467,582 B2 * | 12/2008 | Hembree | 92/98 R |
| 7,475,863 B2 | 1/2009 | Donovan | |
| 7,487,792 B2 | 2/2009 | Yoshino et al. | |
| 7,690,622 B2 * | 4/2010 | Ito et al. | 251/30.02 |
| 7,905,172 B2 * | 3/2011 | Ohrle et al. | 92/103 R |
| 8,104,740 B2 * | 1/2012 | Igarashi | 251/61.2 |
| 2002/0088496 A1 * | 7/2002 | Kondo | 137/522 |
| 2009/0250124 A1 | 10/2009 | Massengale et al. | |
| 2011/0162737 A1 | 7/2011 | Yamauchi | |

* cited by examiner

FLOW CONTROL DEVICE

TECHNICAL FIELD

The present invention relates to a flow control device which controls the flow of chemical solution, purified water, or the like.

BACKGROUND ART

Generally, as disclosed in Patent Literature 1, a flow control device used to regulate the flow of fluid such as chemical solution and purified water used in manufacturing a semiconductor or the like includes: a housing which is formed of a resin material such as a fluororesin having superior chemical resistance so that the fluid would flow in a flow passage provided in the flow control device; a diaphragm which splits the housing in half; and a valve body which is linked with the movement of the diaphragm. In such a flow control device, one of the housing halves split by the diaphragm corresponds to a fluid chamber in which flow-controlled fluid flows while another housing half corresponds to a gas chamber to which control air is supplied, whereby the diaphragm is activated by the differential pressure generated between the fluid chamber and the gas chamber. The flow control device which activates the diaphragm by the differential pressure regulates the flow of the fluid flowing in the fluid chamber by making the valve body work with the movement of the diaphragm.

CITATION LIST

Patent Literature

Patent Literature 1: Japanese Unexamined Patent Application, Publication No. 2004-162774

SUMMARY OF INVENTION

Technical Problem

When the flow of high pressure fluid is to be regulated by the flow control device described in Patent Literature 1, it is required that the control air having high pressure be supplied into the gas chamber, whereby it has been concerned that, when the high pressure control air is acted upon the diaphragm, the diaphragm would be deformed to a great extent toward the fluid chamber side and that a thin film part constituting the diaphragm would break.

An object of the present invention is to provide a flow control device capable of performing accurate flow control over a wide pressure range.

Solution to Problem

A flow control device according to the present invention includes: a housing; a diaphragm splitting the housing into a gas chamber side to which gas is introduced and a fluid chamber side through which fluid passes, and being activated by the differential pressure generated between the gas chamber side and the fluid chamber side; and a valve body which operates in integration with the diaphragm to regulate the flow of the fluid introduced to the fluid chamber side. The diaphragm includes: a base part provided in a substantially central part of the diaphragm; and a thin film part provided on the outer rim of the base part. An opposing surface which is provided on the fluid chamber side to oppose the diaphragm includes a retaining form which retains the shape of the thin film part deformed by the differential pressure.

According to the flow control device of the present invention including the diaphragm activated by the differential pressure between the gas pressure on the gas chamber side and the fluid pressure on the fluid chamber side, the thin film part of the diaphragm would be deformed toward the fluid chamber side when the gas pressure is higher than the pressure on the fluid chamber side, and would be deformed toward the gas chamber side when the fluid pressure is higher than the pressure on the gas chamber side. When the flow of the high pressure fluid is regulated by such a flow control device, the gas having the pressure higher than that of the fluid acting upon the diaphragm would be acted upon the diaphragm to regulate the movement of the valve body.

Now, the deformation of the thin film part of the diaphragm which is activated by the differential pressure between the two chambers formed in the housing is retained by the retaining form provided on the opposing surface which is provided on the fluid chamber side and opposite to the diaphragm. The deformation of the thin film part of the diaphragm caused by the gas pressure can thus be retained by the retaining form on the opposing surface on the fluid chamber side when regulating the flow of the high pressure fluid. Accordingly, the deformation of the thin film part would stop at some point so that the breakage of the diaphragm can be prevented. The flow of the high pressure fluid can thus be regulated accurately.

The flow control device according to the present invention may also be configured such that the gas chamber side includes a holding member which holds the diaphragm between itself and the opposing surface and that a surface of the holding member opposing the diaphragm includes a retaining form which retains the shape of the thin film part deformed by the differential pressure.

When the flow of the high pressure fluid is regulated by the flow control device including the diaphragm which is activated by the differential pressure between the gas pressure on the gas chamber side and the fluid pressure on the fluid chamber side, it is concerned that, in the case where the fluid having the pressure higher than that of the gas is acted upon the diaphragm, the thin film part would be continuously deformed toward the gas chamber side until the diaphragm breaks.

Now, in the aforementioned configuration, the deformation of the thin film part of the diaphragm which is activated by the differential pressure between the two chambers formed in the housing is retained by the retaining form provided on the surface of the holding member opposing the diaphragm, the holding member being provided on the gas chamber side and holding the diaphragm between itself and the opposing surface. The deformation of the thin film part of the diaphragm caused by the fluid pressure can thus be retained by the retaining form provided on the surface of the holding member when regulating the flow of the high pressure fluid. Accordingly, the deformation of the thin film part would stop at some point so that the breakage of the diaphragm can be prevented. The flow of the high pressure fluid can thus be regulated accurately.

The flow control device according to the present invention may also be configured such that the surface of the holding member opposing the diaphragm includes a projection to hold the diaphragm.

According to the aforementioned configuration, the diaphragm can be securely brought into contact with the holding member by including the projection on the surface of the holding member opposing the diaphragm. As a result, the diaphragm can be securely held between the holding member and the opposing surface on the fluid chamber side, whereby a seal structure on a contact surface (seal surface) between the opposing surface on the fluid chamber side and the diaphragm can be securely maintained. The flow of the high pressure fluid can thus be regulated accurately and soundly.

Advantageous Effects of Invention

The deformation of the thin film part of the diaphragm which is activated by the differential pressure between the two chambers formed in the housing is retained by the retaining form which is provided on the opposing surface on the fluid chamber side and opposite to the diaphragm. The deformation of the thin film part of the diaphragm caused by the gas pressure can thus be retained by the retaining form on the opposing surface on the fluid chamber side when regulating the flow of the high pressure fluid. Accordingly, the deformation of the thin film part would stop at some point so that the breakage of the diaphragm can be prevented. The flow of the high pressure fluid can thus be regulated accurately.

DESCRIPTION OF EMBODIMENTS

A structure of a flow control device according to an embodiment of the present invention will now be described with reference to an exploded view illustrated in FIG. 1, schematic block diagrams of a vertical section illustrated in FIGS. 2 and 3, a partially enlarged block diagram illustrated in FIG. 4, and an enlarged view of a diaphragm illustrated in FIG. 5. Here, the valve opening of the flow control device is in the fully-closed state in the case illustrated in FIG. 2 and in the fully-open state in the case illustrated in FIG. 3.

Figure 1:
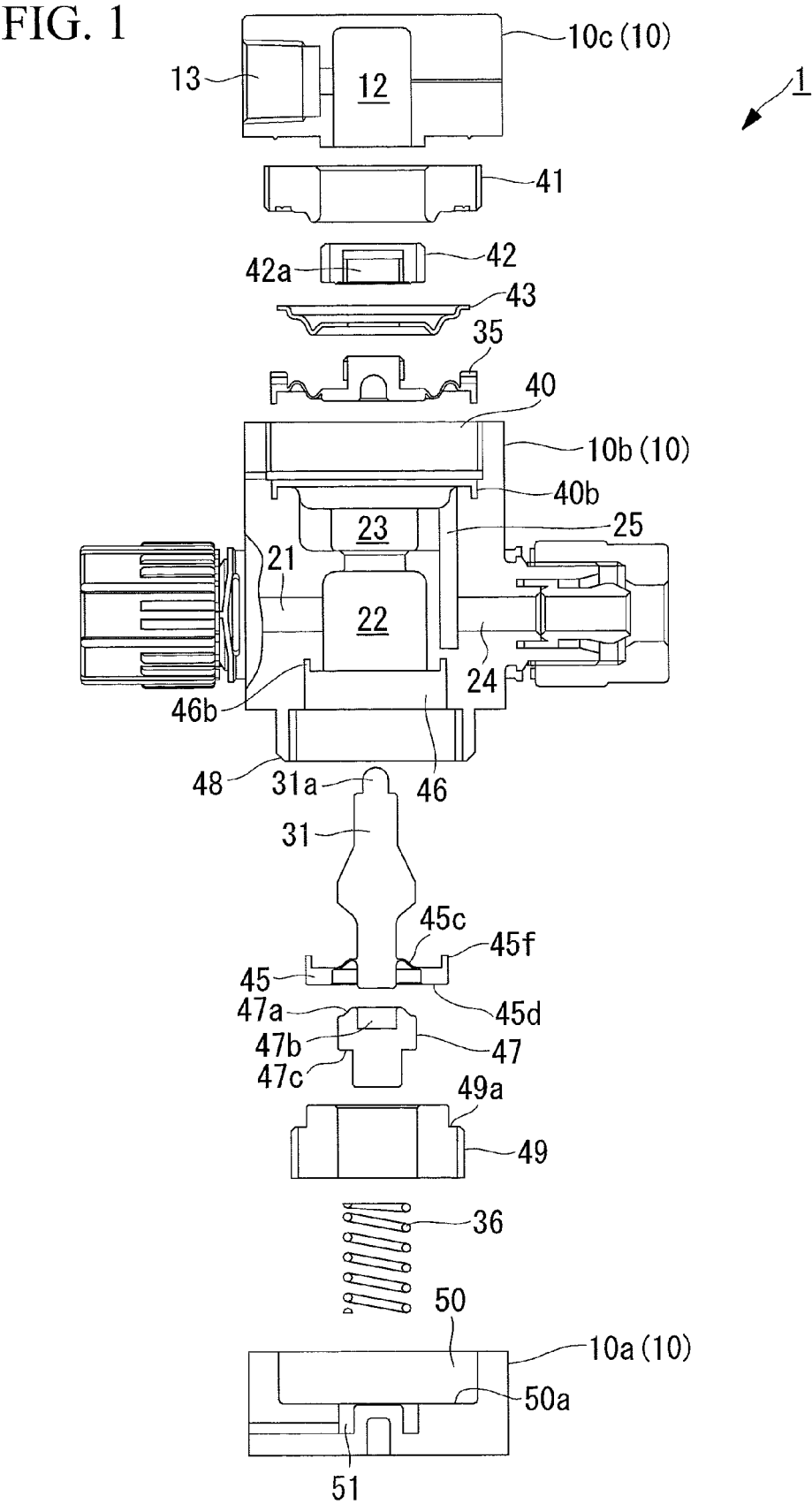
FIG. 1 is an exploded view illustrating a structure of a flow control device according to an embodiment of the present invention.

As illustrated in FIG. 1, a flow control device 1 is used to regulate the flow of fluid such as chemical solution and purified water used in manufacturing a semiconductor or the like, is provided to a supply line (not shown) of the fluid, and is generally referred to as a regulator as well.

Figure 2:
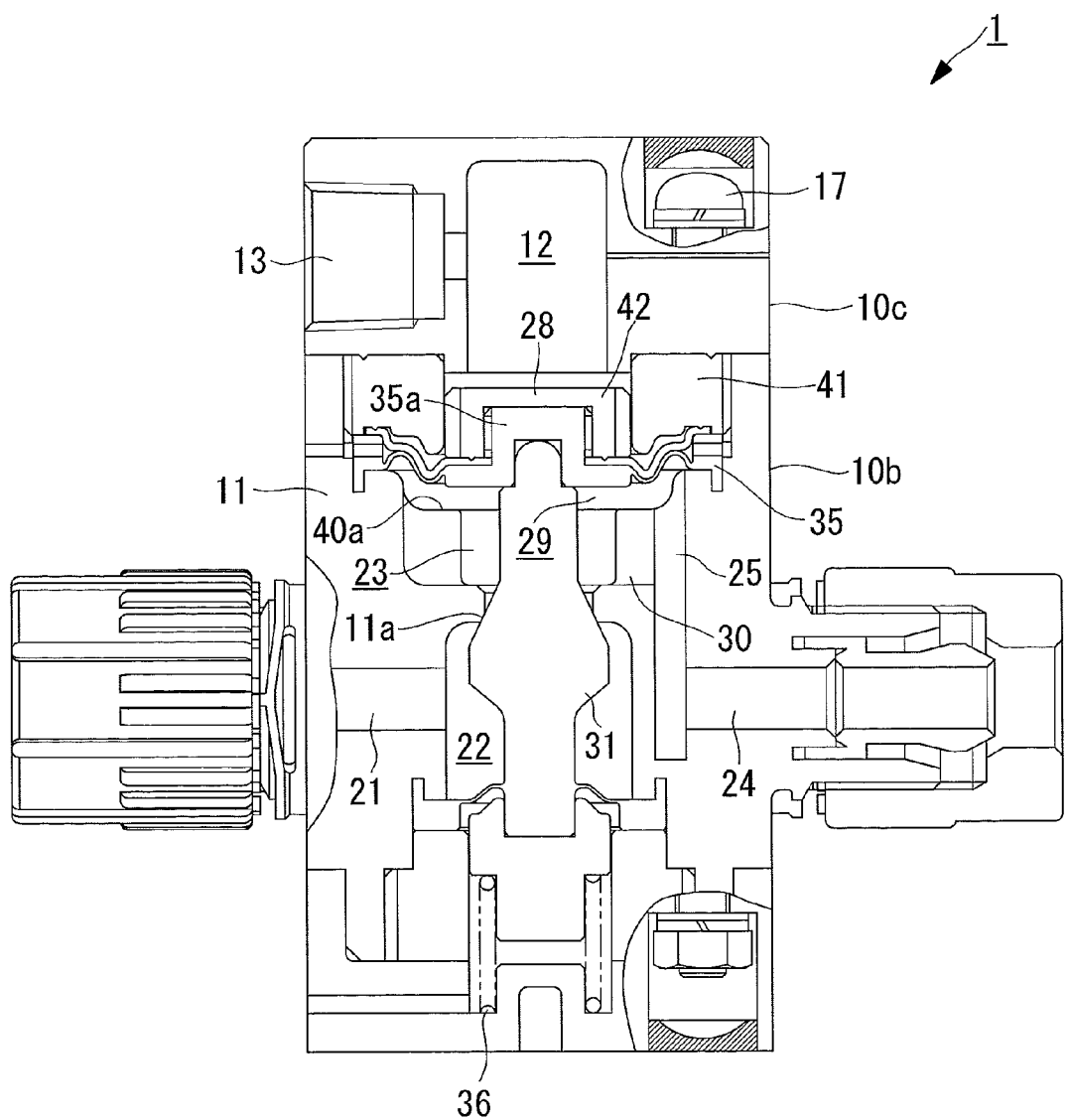
FIG. 2 is a schematic block diagram of a vertical section of the flow control device where the valve opening of the flow control device illustrated in FIG. 1 is in a fully-closed state.

A housing 10 forming the external shape of the flow control device 1 is configured by combining each of three housings 10a, 10b, and 10c, which are fastened by a through-bolt 17 (refer to FIG. 2). The housing 10b among them is formed of a fluororesin such as PTFE or PFA having superior chemical resistance. A material such as PVDF or PFA is used to form the housings 10a and 10c.

Each housing 10a, 10b, and 10c constituting the housing 10 will be described. The lower housing 10a formed of PVDF or PFA corresponds to a base part of the flow control device 1.

The middle housing 10b arranged above the lower housing 10a and formed of PTFE or PFA resin with superior chemical resistance corresponds to a middle part of the flow control device 1 and includes an inlet port 21, an outlet port 24, a first space 22, a second space 23, a flow passage including a middle flow passage 25, and the like.

The upper housing 10c arranged above the middle housing 10b and formed of PVDF or PFA resin corresponds to an upper part of the flow control device 1. The upper housing 10c presses down a support nut (a holding member) 41, which fixes a diaphragm 35 to the middle housing 10b, to the side of the middle housing 10b and includes, above the support nut 41 and a cap nut 42 provided on the inner peripheral side of the support nut, a pressure chamber (a gas chamber side) 12, a control port 13 which supplies control air (gas) to the pressure chamber 12, and the like.

As illustrated in FIG. 2, the middle housing 10b mainly includes therein: a valve seat 11 which has an aperture 11a communicating with the inlet port 21; a valve body 31 which moves perpendicularly (a vertical direction in FIG. 2) to the aperture 11a of the valve seat 11; the diaphragm 35 which is fitted to a support nut housing part 40 (refer to FIG. 1) formed at the upper end of the middle housing 10b; and a spring 36 which presses the valve body 31 against the valve seat 11.

The flow passage provided in the middle housing 10b includes: the first space 22 (typically referred to as a "valve chamber") which communicates from the inlet port 21 to the valve body 31; the second space 23 which is positioned between the valve seat 11 and a bottom surface 40a of the support nut housing part 40; a fluid-side space (on a fluid chamber side) 29 formed between the bottom surface 40a of the support nut housing part 40 and the bottom surface of the diaphragm 35; the middle flow passage 25 which communicates from the fluid-side space 29 to the outlet port 24; and a connecting flow passage 30 which is provided at a part of the middle housing 10b between the second space 23 and the middle flow passage 25 to connect the second space 23 and the middle flow passage 25.

Provided on the upper end surface of the middle housing 10b is the support nut housing part 40 (refer to FIG. 1) which is depressed downward from the upper end of the middle housing 10b and in which the support nut 41 is housed. The diaphragm is provided between the lower end surfaces of the support nut 41 and the cap nut 42 and the bottom surface 40a of the support nut housing part 40.

The support nut 41 housed in the support nut housing part 40 is ring-shaped. The cap nut 42 is housed on the inner peripheral side of the ring-shaped support nut 41. Moreover, a screw (now shown) is formed on the outer peripheral wall of the support nut 41 to be screwed together with a screw (not shown) provided on the inner peripheral wall of the support nut housing part 40 described above. Here, it is preferred that the support nut 41 be formed of a resin material such as PFA, PCTFE, and PEEK which have superior temperature and mechanical characteristics.

A depression 42a (refer to FIG. 1) capable of housing the projection 35a provided to the diaphragm 35 is formed on the lower end surface of the cap nut 42 which is housed on the inner peripheral side of the support nut 41. A screw (now shown) provided on the inner peripheral wall of the depression 42a can be screwed together with a screw (not shown) provided on the outer peripheral wall of the projection 35a.

Here, the height of the cap nut 42 (the length in the axial direction of the flow control device 1) is set shorter than the depth of the support nut housing part 40 (the length in the axial direction of the flow control device 1). As a result, as illustrated in FIG. 2, a gas-side space (a gas chamber side) 28 is formed between the upper end surface of the cap nut 42 and the lower end surface of the upper housing 10c. The gas-side space 28 communicates with the pressure chamber 12 when the upper housing 10c is provided on top of the middle housing 10b.

The structure of the diaphragm 35 in the present embodiment will now be described in detail with reference to FIGS. 4 and 5.

Figure 4:
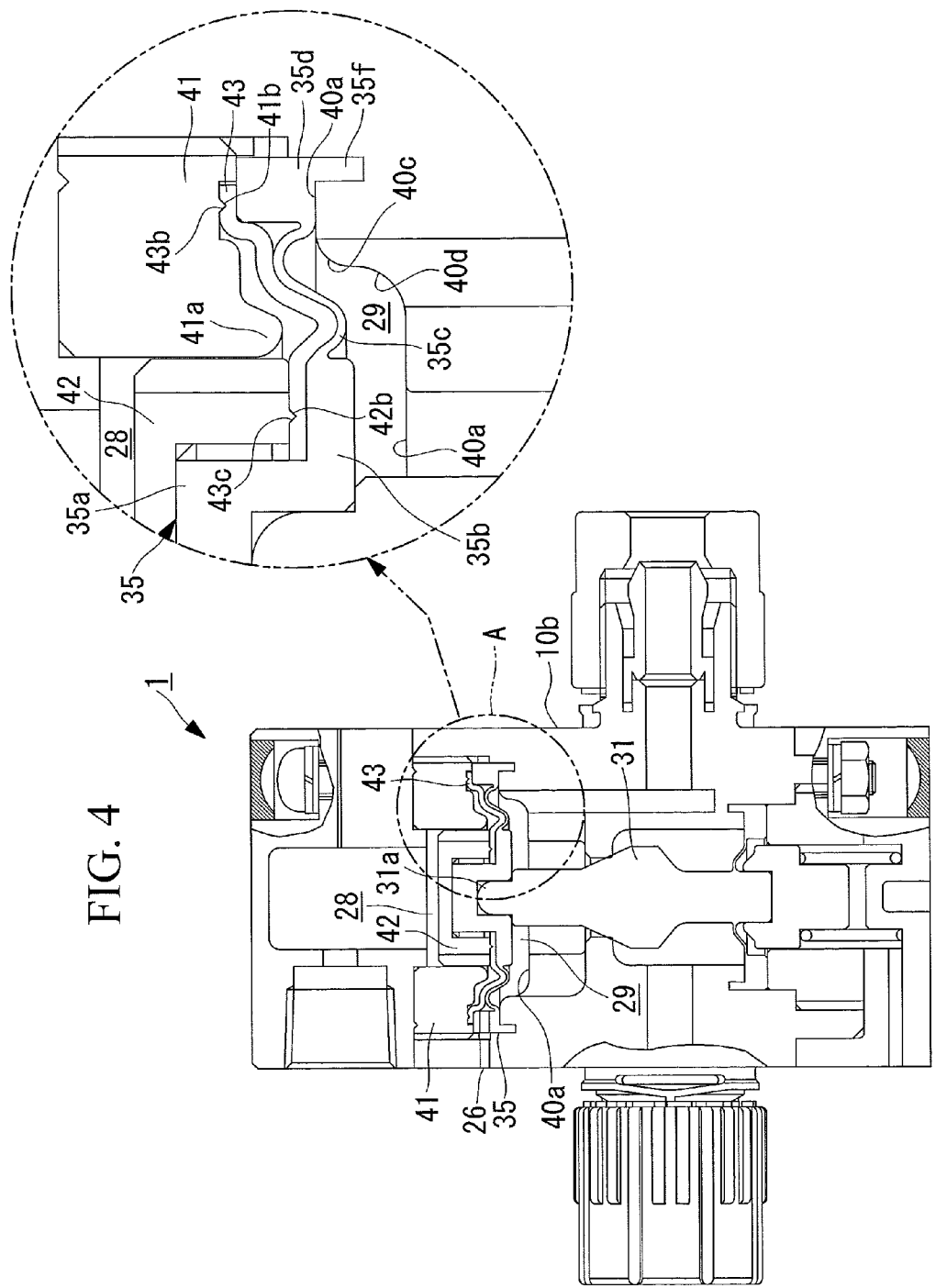
FIG. 4 is a partially enlarged block diagram illustrating a portion A of the flow control device, the valve opening of which illustrated in FIG. 2 is in the fully-closed state.

As illustrated in FIG. 4, the diaphragm 35 is positioned between the lower end surfaces of the support nut 41 and the cap nut 42 and the bottom surface 40a of the support nut housing part 40 (refer to FIG. 1) and is sized to be housed in the support nut housing part 40.

Moreover, a permeation protection sheet 43 to be described later is provided on the top surface of the diaphragm 35.

When the differential pressure is generated between the fluid-side space 29 and the gas-side space 28 described above, the external force is applied to the top surface of the diaphragm 35, thereby causing a thin film part 35c to be described later to be displaced and a diaphragm base (a base part) 35b to be moved in a perpendicular direction (a vertical direction in FIG. 4). The valve body 31 in contact with the diaphragm 35 would accordingly move in the perpendicular direction by the movement of the diaphragm base 35b. As a result, the flow of the fluid passing through the flow passage in the flow control device 1 would be regulated.

The diaphragm 35 is formed of the resin material or the like of PTFE or PFA, for example, and is substantially disc-shaped with an outer diameter thereof approximately equal to an inner diameter of the support nut housing part 40 (refer to FIG. 1). As illustrated in FIG. 5, the diaphragm 35 includes: the diaphragm base 35b which is provided in the substantially central part; the thin film part 35c which is ring-shaped and provided on the outer rim of the diaphragm base 35b; and a thick outer peripheral edge 35d provided at the outer peripheral edge of the thin film part 35c. Note that the thin film part 35c is thinner than the diaphragm base 35b while the outer peripheral edge 35d is thicker than the thin film part 35c.

The projection 35a which is projected upward is provided on the top surface side of the diaphragm base 35b in the substantially central part thereof. Moreover, a recess 35e, which is concave upward and to which a protrusion 31a (refer to FIG. 4) of the valve body 31 can be inserted, is formed on the bottom surface side of the projection 35a provided to the diaphragm base 35b.

As illustrated in FIG. 4, for example, the bottom surface of the outer peripheral edge 35d of the diaphragm 35 is in contact with a part of the bottom surface 40a of the support nut housing part 40 (refer to FIG. 1). An annular projection 35f which is projected downward is provided on the bottom surface of the outer peripheral edge 35d. The annular projection 35f is fitted to an annular recess 40b (refer to FIG. 1) which is provided on the outer peripheral edge of the bottom surface 40a. Moreover, the top surface of the outer peripheral edge 35d is in contact with the bottom surface of the permeation protection sheet 43.

Figure 3:
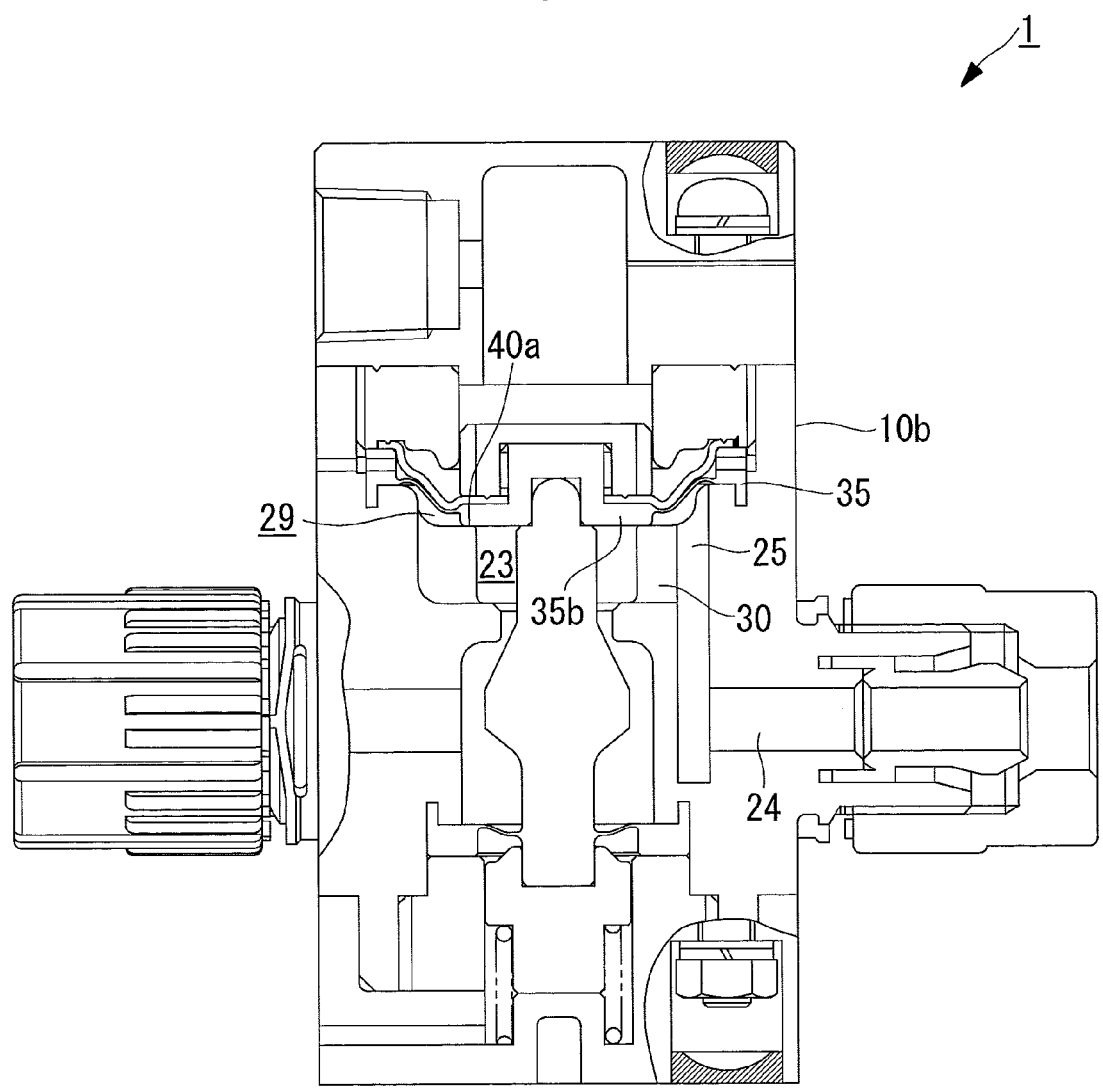
FIG. 3 is a schematic block diagram of a vertical section of the flow control device where the valve opening of the flow control device illustrated in FIG. 1 is in a fully-open state.

When the valve opening of the flow control device 1 is in the fully-open state, the bottom surface of the diaphragm base 35b of the diaphragm 35 is in contact with the bottom surface 40a so that the fluid-side space 29 is not formed between the bottom surface of the diaphragm base 35b and the bottom surface 40a as illustrated in FIG. 3, for example.

Here, as illustrated in FIG. 4, a step 40c is provided on the approximately outer side of the bottom surface 40a of the support nut housing part 40 along the radial direction, and the bottom surface 40a provided on the approximately inner side of the step 40c along the radial direction is recessed below the bottom surface 40a on the approximately outer side of the step 40c.

A protective form (a retaining form) 40d is formed on the bottom surface 40a on the approximately inner side of the step 40c along the radial direction. When the thin film part 35c of the diaphragm 35 is deformed (bent) downward by the pressure of the control air introduced to the gas-side space 28, the protective form (retaining form) 40d can retain the shape of the thin film part 35c by suppressing further downward deformation thereof. The protective form also has a smooth shape along the shape of the thin film part 35c.

Figure 5:
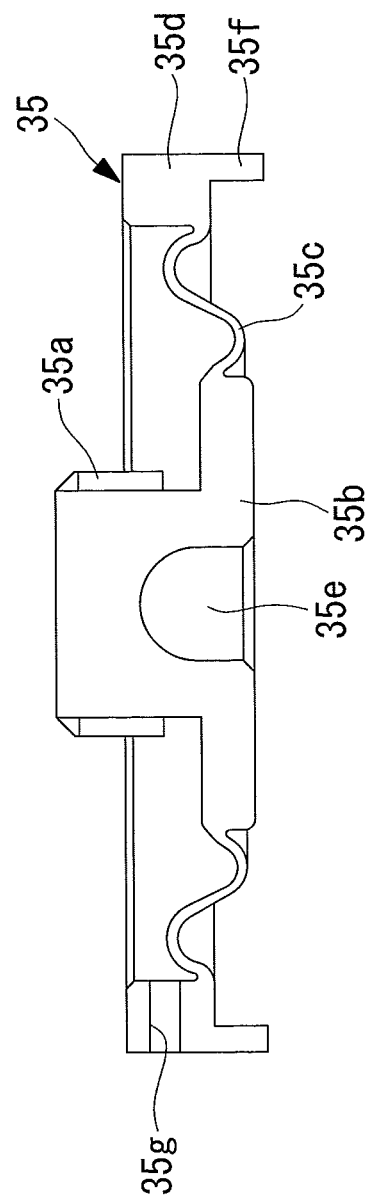
FIG. 5 is an enlarged view of a diaphragm illustrated in FIG. 1.

Moreover, a gas vent hole 35g passing through from the inner side to the outer side (from the right side to the left side in FIG. 5) along the radial direction is provided to a part of the thick outer peripheral edge 35d forming the diaphragm 35, as illustrated in FIG. 5. As illustrated in FIG. 4, an end of the gas vent hole 35g is communicated with a permeating gas vent hole 26 passing through from the support nut housing part 40 toward the outer side of the middle housing 10b along the radial direction.

The gas vent hole 35g is provided to exhaust, to the outside of the flow control device 1, a corrosive gas passing through the thin film part 35c of the diaphragm 35 when a chemical solution such as hydrofluoric acid or nitric acid having gas permeability is fed, the corrosive gas being produced by the volatilization of the fluid passing through the fluid-side space 29.

The top surface of the diaphragm 35 is provided with the permeation protection sheet 43 which is formed along the shape of the thin film part 35c to reinforce the thin film part 35c made into a thin film. The permeation protection sheet 43 formed of a highly flexible rubber sheet has a role of preventing the corrosive gas from flowing into the gas-side space 28 from the fluid-side space 29 when the corrosive gas produced from the fluid (a chemical solution such as hydrofluoric acid or nitric acid) flowing in the fluid-side space 29 has permeated the thin film part 35c. Moreover, the permeation protection sheet 43 has a role of sufficiently securing the deformation of the thin film part 35c caused by the pressure of the fluid flowing in the fluid-side space 29 while keeping the strength of the thin film part 35c high against the deformation.

The permeation protection sheet 43 is disc-shaped with no center part to match the shape of the diaphragm 35, while the outer peripheral edge and the inner peripheral edge on the top surface side of the permeation protection sheet 43 are brought into contact with the lower end surface of each of the support nut 41 and the cap nut 42, respectively. The outer peripheral edge on the bottom surface side of the permeation protection sheet 43 is brought into contact with the top surface of the outer peripheral edge 35d of the diaphragm 35. Accordingly, the outer peripheral edge of the permeation protection sheet 43 and the outer peripheral edge 35d of the diaphragm 35 are held between the support nut 41 and the bottom surface 40a of the support nut housing part 40.

An edge (an annular projection) 41b provided on the lower end surface (a surface opposing the diaphragm 35) of the support nut 41 is bit into the top surface of the outer peripheral edge of the permeation protection sheet 43, while an edge 42b provided on the lower end surface of the cap nut 42 is bit into the top surface of the inner peripheral edge of the permeation protection sheet 43.

Each of edge receiving parts 43b and 43c is formed into a ring shape across the circumferential direction of the outer peripheral edge and the inner peripheral edge (partially) of the permeation protection sheet 43, respectively, and has a substantially V-shaped cross section.

The edge receiving parts 43b and 43c are cut into the top surface of the permeation protection sheet 43 while the cap nut 42 is screwed together with the projection 35a of the diaphragm 35 and the support nut 41 is screwed together with the support nut housing part 40. As a result, the lower end surfaces of the outer peripheral edge of the support nut 41 and the inner peripheral edge of the cap nut 42 can be securely sealed with the top surface of the outer peripheral edge and the inner peripheral edge of the permeation protection sheet 43, respectively.

A smooth protective form (a retaining form) 41a along the shape of the thin film part 35c and the permeation protection sheet 43 is formed on the lower end surface of the support nut 41. When the thin film part 35c of the diaphragm 35 and the permeation protection sheet 43 provided on the top surface of the thin film part 35c are deformed upward (bent) by the pressure of the fluid flowing into the fluid-side space 29, the protective form can retain the shapes of the thin film part 35c and the permeation protection sheet 43 by suppressing further upward deformation thereof.

As illustrated in FIG. 2, the sealed gas-side space 28 and the pressure chamber 12 can be formed by providing the upper housing 10c above the support nut 41 and the cap nut 42 on the side opposite to where the diaphragm 35 is held between the upper end of the middle housing 10b and the support nut 41 and the cap nut 42. The gas-side space 28 communicates with the pressure chamber 12 formed in the upper housing 10c, whereas the pressure chamber 12 communicates with the control port 13 formed on the side wall of the upper housing 10c.

As illustrated in FIG. 1, a diaphragm 45 is integrally provided to the outer periphery of the valve body 31 near the tip (the lower end) thereof, the valve body being provided in the middle housing 10b. In addition, the protrusion 31a is provided at the upper end of the valve body 31 into which the diaphragm is integrated.

The diaphragm 45 integrally provided to the valve body 31 includes: a thin film part 45c provided outward in the radial direction from the valve body 31; an outer peripheral edge 45d which is thicker than the thin film part 45c and provided on the outer peripheral edge thereof; and an annular projection 45f which is provided on the top surface of the outer peripheral edge 45d and projected upward.

The outer diameter of the diaphragm 45 is approximately equal to the inner diameter of a diaphragm insertion groove 46 formed at the lower end of the middle housing 10b. When the diaphragm 45 is inserted from the bottom part of the middle housing 10b to be housed in the diaphragm insertion groove 46, the annular projection 45f provided in the diaphragm 45 is fitted to an annular recess 46b provided on the top surface of the diaphragm insertion groove 46 across the outer peripheral edge thereof.

A spring folder 47 is provided to the tip of the valve body 31 from below. Provided on the top surface of the spring folder 47 is a protective form 47a which can retain the shape of the thin film part 45c by suppressing further deformation of the thin film part 45c of the diaphragm 45 when the diaphragm 45 integrally provided to the valve body 31 is deformed by the fluid flowing in the first space 22.

A recess 47b which is depressed downward and into which the tip of the valve body 31 can be inserted is formed in the substantially central part of the spring folder 47 on the top surface side thereof. Moreover, the spring folder 47 includes, in the middle of the side wall thereof, a step 47c where the outer diameter of the side wall below the step 47c is smaller than the outer diameter of the side wall above the step 47c. A spring 36 is provided on the outer periphery of the spring folder 47 below the step 47c.

While the spring 36 is provided on the outer periphery of the side wall of the spring folder 47 below the step 47c, a valve body binding member 49 is provided to the spring folder 47 from the lower end side thereof. It is preferred that the valve body binding member 49 be formed of a resin material with the temperature and mechanical characteristics superior to that of the lower housing 10a, the resin material preferably being PFA, PCTFE, PEEK or the like in this case.

The spring 36 can be retained between the inner peripheral wall of the cylindrical valve body binding member 49 and the spring folder 47 provided on the inner peripheral wall, while a step 49a is provided in the middle of the outer peripheral wall of the valve body binding member 49. The outer diameter of the valve body binding member 49 above the step 49a is smaller than below the step 49a. The valve body binding member 49 above the step 49a is inserted into the diaphragm insertion groove 46 from below to be housed therein after the diaphragm 45 is housed in the diaphragm insertion groove 46 of the middle housing 10b.

A screw (not shown) is provided on the outer peripheral wall of the valve body binding member 49 below the step 49a. The valve body binding member 49 can be housed inside an annular lower screwing part 48 by screwing together the screw provided on the outer peripheral wall of the valve body binding member 49 and a screw (not shown) provided on the inner peripheral wall of the lower screwing part 48 which is connected to the lower end of the middle housing 10b.

The lower housing 10a is provided upward to the lower end of the middle housing 10b. A recess 50 which is depressed downward is provided on the top surface of the lower housing 10a. The inner diameter of the recess 50 is approximately equal to the outer diameter of the lower screwing part 48 provided at the lower end of the middle housing 10b. Also provided in a substantially central part of a bottom surface 50a of the recess 50 is a spring groove 51 which can house the lower end of the spring 36 when the spring 36 is housed in the inner peripheral side of the valve body binding member 49.

The lower housing 10a is provided at the lower end of the middle housing 10b by housing the lower screwing part 48 of the middle housing 10b in the recess 50 of the lower housing 10a and housing the lower end of the spring 36 projected below the valve body binding member 49 into the spring groove 51 provided on the bottom surface 50a of the recess 50.

By providing the lower housing 10a to the middle housing 10b in the aforementioned manner, the spring 36 would be disposed between the step 47c of the spring folder 47 and the bottom surface 50a of the lower housing 10a as described above, whereby the valve body 31 can be pressed upward toward the valve seat 11 as illustrated in FIGS. 2 and 3.

A method of regulating the flow of the fluid by the flow control device 1 configured in the aforementioned manner will be described with reference to FIGS. 2 to 5.

First, as illustrated in FIG. 2, the fluid is introduced to the inlet port 21 of the flow control device 1 from the fluid supply line while the valve opening of the flow control device 1 is in the fully-closed position. The fluid introduced to the inlet port 21 fills the first space 22 because the valve body 31 is in contact with the valve seat 11.

Next, the control air is supplied from the control port 13 provided in the upper housing 10c. As a result, the pressure chamber 12 formed in the upper housing 10c as well as the gas-side space 28 communicating with the pressure chamber 12 are pressurized. By pressurizing the pressure chamber 12 and the gas-side space 28, the diaphragm 35 having acquired the force surpassing the elastic force of the spring 36 provided at the lower part of the middle housing 10b is pressed down. As a result, the valve body 31 is separated from the valve seat 11 through the diaphragm 35. Once the valve body 31 is separated from the valve seat 11, the aperture 11a of the valve seat 11 is opened so that the fluid in the first space 22 would flow into the second space 23.

The distance travelled by the valve body 31 in the perpendicular direction would vary according to the degree of pressure applied to the pressure chamber 12 and the gas-side space 28. The valve opening of the flow control device 1 would thus be adjusted according to the degree of pressurization. As a result, the flow of the fluid passing through the aperture 11a of the valve seat 11 would change by adjusting the valve opening.

As described above, the diaphragm 35 is pressed down when adjusting the flow of the fluid by pressurizing the pressure chamber 12 and the gas-side space 28. That is, the diaphragm base 35b and the thin film part 35c would move downward by the pressure of the control air acting upon the top surface of the diaphragm base 35b and the thin film part 35c of the diaphragm 35 illustrated in FIG. 4. Here, the protective form 40d formed on the bottom surface 40a of the support nut housing part 40 (refer to FIG. 1) would suppress further downward deformation of the thin film part 35c.

The fluid having passed through the aperture 11a would flow from the second space 23 into the fluid-side space 29, as illustrated in FIG. 3. The fluid having flowed into the fluid-side space 29 would further flow into the middle flow passage 25. Here, the connecting flow passage 30 is provided between the second space 23 and the middle flow passage 25 in the middle housing 10b as described above.

The connecting flow passage 30 is provided to pass through between a part of the circumferential direction of the second space 23 formed annularly on the outer periphery of the valve body 31 and the middle flow passage 25. The length of the connecting flow passage 30 in the axial direction of the flow control device 1 is approximately equal to the length of the second space 23 in the axial direction of the flow control device 1. A part of the fluid having flowed into the second space 23 would flow out therefrom into the middle flow passage 25 through the connecting flow passage 30.

The fluid having flowed into the middle flow passage 25 from the fluid-side space 29 and the connecting flow passage 30 would flow out toward the outlet port 24. Accordingly, the flow of the fluid in the flow control device 1 can be regulated.

Now, FIG. 3 will be used to describe a case where the valve opening of the flow control device 1 is increased to be in the fully-open state.

As illustrated in FIG. 3, when the valve opening of the flow control device 1 is in the fully-open state, the diaphragm base 35b of the diaphragm 35 is in contact with the bottom surface 40a of the middle housing 10b.

The second space 23 and the fluid-side space 29 would not be communicated with each other since the diaphragm base 35b is in contact with the bottom surface 40a. As a result, the fluid would not flow into the fluid-side space 29 or from the fluid-side space 29 to the middle flow passage 25.

However, the connecting flow passage 30 provided in a part of the middle housing 10b in the flow control device 1 would allow the fluid having flowed into the second space 23 to flow from the second space 23 to the middle flow passage 25 through the connecting flow passage 30. Therefore, the fluid can flow with the maximum flow (the flow of the fluid when the valve opening is in the fully-open state) toward the outlet port 24 and out by way of the connecting flow passage 30 even when the valve opening of the flow control device 1 is in the fully-open state and the diaphragm base 35b is in contact with the bottom surface 40a.

The following effect can be attained by the flow control device 1 according to the present embodiment.

The deformation of the thin film part 35c of the diaphragm 35 which is activated by the differential pressure between the gas-side space (the gas chamber side) 28 and the fluid-side space (the fluid chamber side) 29 that are formed in the housing 10 (the differential pressure between the two chambers) is retained by the protective form (the retaining form) 40d provided on the bottom surface 40a of the support nut housing part 40 formed in the middle housing 10b (the opposing surface of the fluid-side space 29 opposite to the diaphragm 35). The deformation of the thin film part 35c of the diaphragm 35 caused by the pressure of the control air (gas) can thus be retained by the protective form 40d provided on the bottom surface 40a when regulating the flow of the high pressure fluid. Accordingly, the deformation of the thin film part 35c would stop at some point so that the breakage of the diaphragm 35 can be prevented. The flow of the high pressure fluid can thus be regulated accurately.

The deformation of the thin film part 35c of the diaphragm 35 which is activated by the differential pressure between the gas-side space 28 and the fluid-side space 29 is retained by the protective form (the retaining form) 41a provided on the lower end surface (the surface opposing the diaphragm 35) of the support nut (the holding member) 41 holding the diaphragm 35 between itself and the bottom surface 40a of the support nut housing part 40. The deformation of the thin film part 35c caused by the fluid pressure can thus be retained by the protective form 41a provided on the bottom surface of the support nut 41 when regulating the flow of the high pressure fluid. Accordingly, the deformation of the thin film part 35c would stop at some point so that the breakage of the diaphragm 35 can be prevented. The flow of the high pressure fluid can thus be regulated accurately.

The annular edge (projection) 41b provided on the lower end surface of the support nut 41 is bit into the outer peripheral edge of the permeation protection sheet 43 across the circumferential direction, the permeation protection sheet being provided on the top surface of the diaphragm 35. The diaphragm 35 can thus be securely brought into contact with the support nut 41 through the permeation protection sheet 43. As a result, the diaphragm 35 and the permeation protection sheet 43 can be securely held between the support nut 41 and the outer peripheral edge of the bottom surface 40a of the support nut housing part 40 forming the fluid-side space 29, whereby the seal structure between the bottom surface 40a and the diaphragm 35 can be securely maintained. The flow of the high pressure fluid can thus be regulated accurately and soundly.

While it has been described in the present embodiment that the housing 10 is formed of the resin material such as PVDF, PFA, and PTFE, the present invention may also employ a resin material such as PPS or P.P.

Moreover, as a modification of the present embodiment, a control means for controlling the upward movement of the valve body 31 may be provided to slightly open the aperture 11a of the valve seat 11 when the valve opening of the flow control device 1 is in a closed state, so that dust (particles) would not be produced by bringing the valve body 31 and the valve seat 11 into contact with each other.

Figure 6:
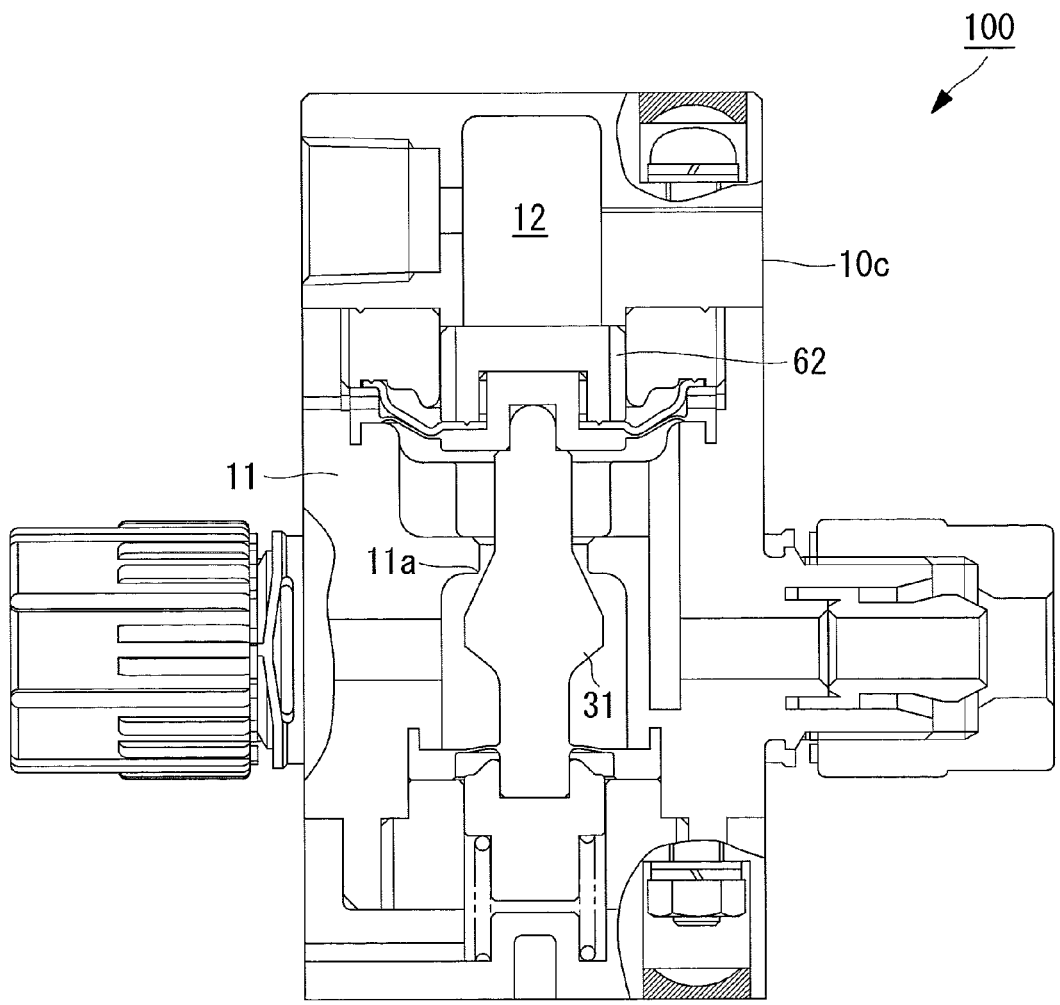
FIG. 6 is a schematic block diagram of a vertical section of a flow control device according to a modification of the present invention.

A flow control device 100 according to the modification of the present invention is illustrated in FIG. 6.

The flow control device 100 is provided with a cap nut (a control means) 62 which controls the upward movement of the valve body 31 to prevent the generation of dust. The cap nut 62 is different from the cap nut 42 (refer to FIG. 2) of the aforementioned embodiment in terms of the height only. That is, the height of the cap nut 62 of the present modification is greater (longer) than that of the cap nut 42 illustrated in FIG. 2.

The bottom surface of the upper housing 10c is brought into contact with the top surface of the cap nut 62 by making the cap nut 62 tall as illustrated in FIG. 6, so that the gas-side space 28 (refer to FIG. 2) is not formed between the bottom surface of the upper housing 10c and the top end surface of the cap nut 62. As a result, the valve body 31 would be slightly moved upward in the perpendicular direction with respect to the aperture 11a of the valve seat 11 so that the valve body 31 and the valve seat 11 are not in contact with each other even when the control air is not supplied to the pressure chamber 12 (when the valve opening of the flow control device 100 is in the closed state).

Since the valve body 31 and the valve seat 11 are not in contact with each other, there can be prevented the dust (particles) generated by bringing the valve body 31 and the valve seat 11 into contact with each other as illustrated in FIG. 2 of the aforementioned embodiment.

REFERENCE SIGNS LIST

1 flow control means
10b housing (middle housing)
23 flow passage (second space)
28 gas chamber side (gas-side space)
29 fluid chamber side (fluid-side space)
31 valve body
35 diaphragm
35b base part (diaphragm base)
35c thin film part
40a opposing surface (bottom surface)
40d retaining form (protective form)

The invention claimed is:
1. A flow control device comprising:
a housing;
a diaphragm splitting the housing into a gas chamber side to which gas is introduced and a fluid chamber side through which fluid passes, and being activated by differential pressure between the gas chamber side and the fluid chamber side; and
a valve body which operates in integration with the diaphragm to regulate flow of the fluid introduced into the fluid chamber side,
wherein the diaphragm includes a base part provided in a substantially central part of the diaphragm, a thin film part provided on an outer peripheral edge of the base part and configured to be thinner than the base part, and a thick outer peripheral edge part provided on an outer peripheral edge of the thin film part and configured to be thicker than the thin film part,
wherein a gas chamber side surface of the thin film part of the diaphragm is covered by a permeation protection sheet, separate from the diaphragm, for preventing fluid permeation from the fluid chamber side to the gas chamber side,
wherein an outer peripheral edge of the permeation protection sheet is pushed to the thick outer peripheral edge part of the diaphragm using a first annular projection, and an inner peripheral edge of the permeation protection sheet is pushed to the base part of the diaphragm using a second annular projection, and
wherein an opposing surface which is provided on the fluid chamber side and opposite to the diaphragm has a retaining form which retains a shape of the thin film part deformed by the differential pressure.
2. The flow control device according to claim 1, wherein
the gas chamber side includes a holding member which holds the diaphragm between itself and the opposing surface, and
a surface of the holding member opposite to the diaphragm includes a retaining form which retains a shape of the thin film part deformed by the differential pressure.

\* \* \* \* \*